Feb. 6, 1940.　　　D. A. DEEMS　　　2,189,709
ELECTRIC STEAMING IRON
Filed July 13, 1936　　　2 Sheets-Sheet 1
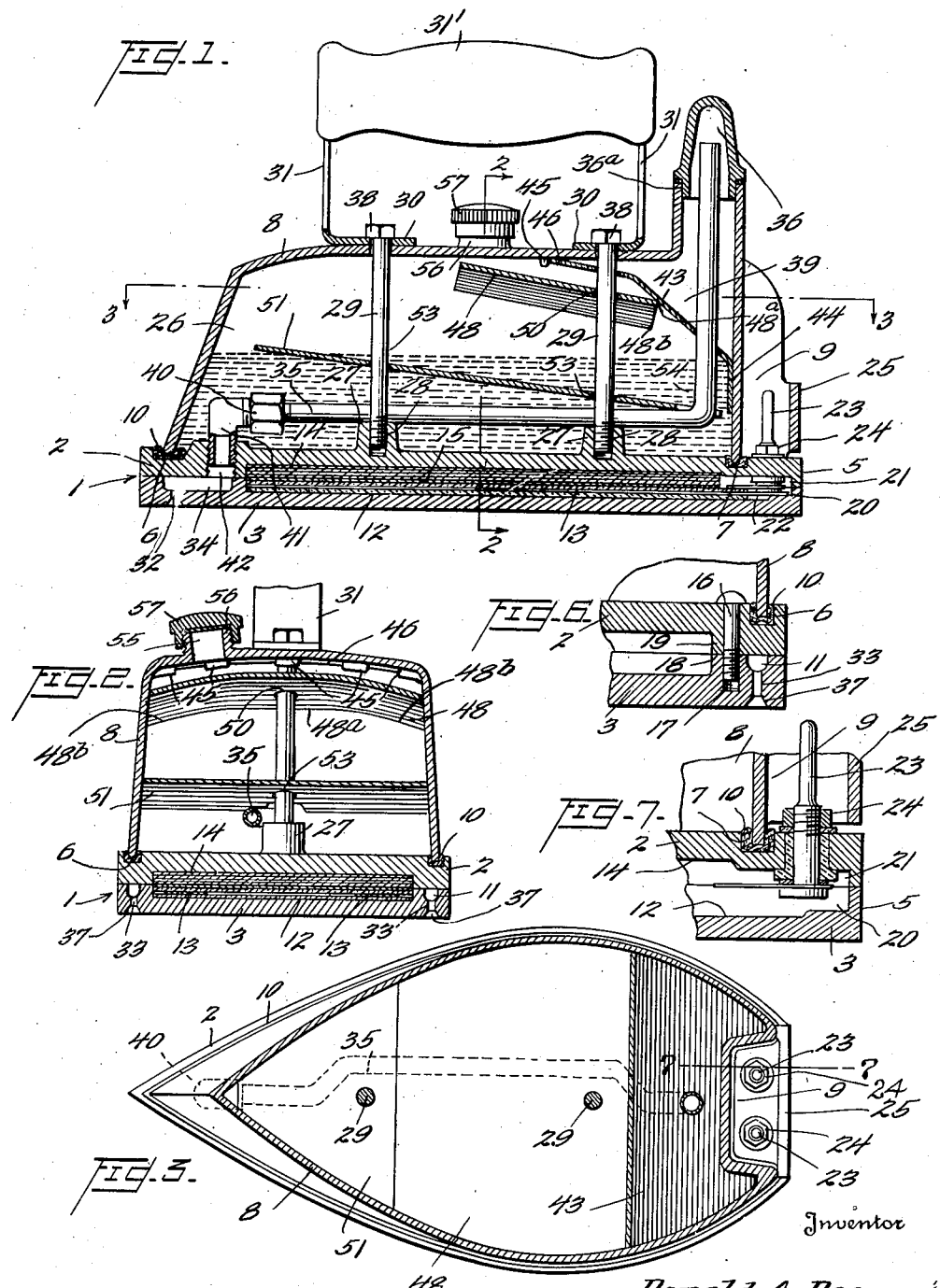
Inventor
Donald A. Deems,
By [signature]
Attorney Feb. 6, 1940.  D. A. DEEMS  2,189,709
ELECTRIC STEAMING IRON
Filed July 13, 1936  2 Sheets-Sheet 2
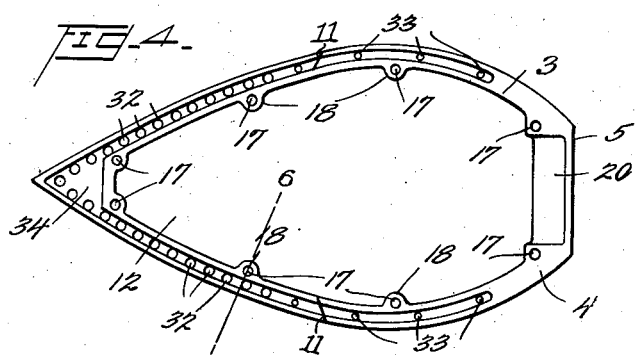
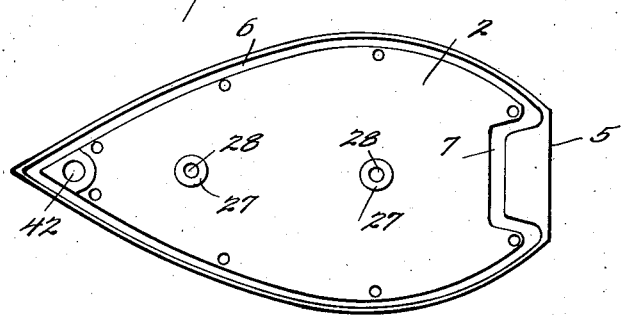
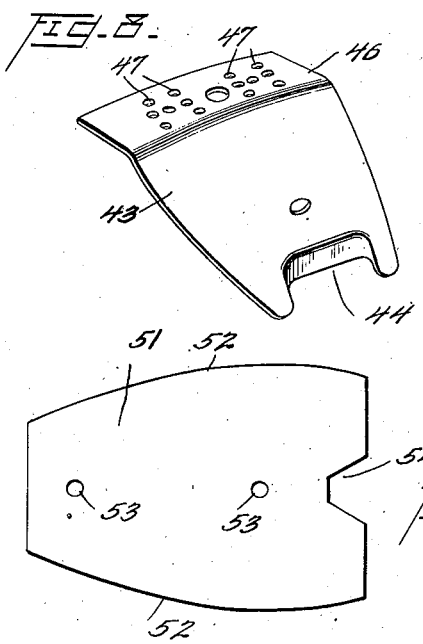
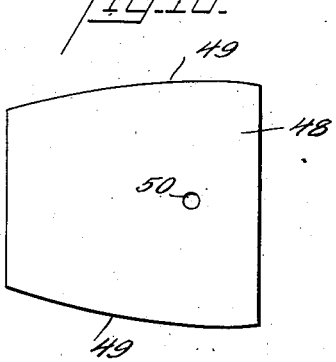
Inventor
Donald A. Deems,
By
Attorney Patented Feb. 6, 1940

2,189,709

UNITED STATES PATENT OFFICE 2,189,709

ELECTRIC STEAMING IRON

Donald A. Deems, St. Louis, Mo., assignor to Ernest F. Pohl, St. Louis, Mo.

Application July 13, 1936, Serial No. 90,429

18 Claims. (Cl. 38—77)

The invention relates to an electric steaming iron.

The invention has for its object to provide an electric steaming and pressing iron having self-contained steam generating and iron heating means and adapted to afford a uniform flow of wet steam free from water particles directly to dry articles to be pressed thereby obviating the necessity of sprinkling, dampening and rolling such articles previous to ironing and at the same time eliminating all danger of mildew. By wet steam it is meant that the steam is damp or moist as contradistinguished from dry steam. The damp or moist steam is free from water particles.

A further object of the invention is to control the heating of the water and steam and prevent violent boiling such as bubbling and foaming of the water without interfering with the heating of the base of the iron and the lower pressing face thereof.

Another object of the invention is to provide means for causing a continuous circulation of water within the water reservoir and for breaking up air pockets in the bubbles and preventing the expansion such as increase in volume of the water due to entrained bubbles or similar effect and thereby reduce active ebullition of the heated water such as foaming and bubbling so that there will be no liability of the water boiling up into the steam dome or steam chamber and passing into the steam conduit leading to the pressing face of the iron.

Another object of the present invention is to provide a simple and inexpensive steam pressing iron of very few parts; of proper weight and size conducive to ease of use and operation and having one heating means therein, in this instance electric heating means, which heats the pressing surface of the iron and also generates a supply of steam within the iron, which steam is moist or damp and absolutely free of water and supplied to the exterior pressing face of the iron thereby obviating the necessity of sprinkling or otherwise wetting the article or material to be ironed.

Another object of the invention is to provide an electrically heated self-contained steaming iron having a non-leakable reservoir for containing a goodly amount of water so as to obviate the necessity of frequent fillings; the water to be rapidly generated into damp or moist steam by the means for heating the pressing face of the iron; there being a constant supply of generated steam in the iron available for use during the entire ironing operation.

A further object of the invention is to provide for the rapid radiation of heat from the water reservoir to assist in the control of the heating of the water without interfering with the efficiency of the heat retaining characteristics of the base of the iron in maintaining the pressing face at the desired temperature.

A further object of the invention is to provide means for preventing the water in the reservoir from splashing into the steam dome or steam chamber during the use of the iron without interfering with the circulation of the water and the control thereby of the boiling or expansion of the water.

Another object of the invention is to provide a pressing iron having a self-contained steam generating and iron heating means and equipped with a heat retaining iron base and a heat radiating aluminum reservoir forming shell adapted to radiate heat rapidly and assist in the control of the heating of the water and steam, said iron having in the joint or connection between the shell and the base an expansible calking adapted to compensate for the unequal expansion and contraction of the iron base and the aluminum shell and maintain a water and steam tight joint between the shell and base so that there will be no danger of such unequal expansion and contraction causing a leakage of water from the reservoir.

It is still further designed to provide an electric steaming iron embodying a base upon which a shell is mounted and which shell, together with that portion of said base upon which said shell rests forms a hollow body and constitutes a water reservoir in which water is heated and generated into steam through the instrumentality of an electric heater and which shell has an inset recess at its rear end in which electric contact elements are mounted for cooperative connection with the electric heater and for co-action with the plug of an electric cord, there being a plate extending across the open side of said recess and forming a rear wall for the same to provide a socket for the reception of the plug.

With these and other objects in view, the invention consists in the construction and novel combination and arrangement of parts hereinafter fully described, illustrated in the accompanying drawings and pointed out in the claims hereto appended, it being understood that various changes in the form, proportion and details of construction, within the scope of the claims, may be resorted to without departing from the spirit or sacrificing any of the advantages of the invention.

In the drawings:

Fig. 1 is a longitudinal sectional view of an electric steaming iron constructed in accordance with this invention.

Fig. 2 is a transverse sectional view of the same taken on the line 2—2 of Fig. 1.

Fig. 3 is a horizontal sectional view of the iron taken on the line 3—3 of Fig. 1.

Fig. 4 is a plan view of the lower section of the base.

Fig. 5 is a similar view of the upper section of the base.

Fig. 6 is a detail sectional view taken substantially on the line 6—6 of Fig. 4.

Fig. 7 is a detail sectional view taken substantially on the line 7—7 of Fig. 3.

Fig. 8 is a detail view of the partition for forming the steam chamber.

Fig. 9 is a detail view of the lower baffle plate.

Fig. 10 is a detail view of the upper baffle or splash plate.

In the accompanying drawings in which is illustrated the preferred embodiment of the invention 1 designates the base of the electric steaming and pressing iron, said base being divided horizontally into upper and lower sections 2 and 3 preferably consisting of gray iron castings and coated or plated to render them rust-proof but any other suitable heat retaining metal such as cast steel may be employed in the construction of the base. The base tapers forwardly from a point intermediate its ends similar to a conventional sad iron and the rear portion 4 of the base is extended and tapered or rounded to increase the pressing and drying surface of the iron and at the same time enable the iron to be moved rearwardly without causing the ripple or wrinkle which is produced in a garment or fabric when an iron of the ordinary construction having a square or straight rear end is moved backwardly. The side edges of the base are curved and the rear extension is provided at the rear end of the base with a relatively short straight transverse edge 5 to enable the iron to be set up on end.

The upper section 2 of the base is provided in its upper face adjacent its side edges with a continuous marginal groove 6 arranged in parallelism with the side edges of the base and having at the rear of the base an inwardly or forwardly offset portion 7. The continuous marginal groove 6 receives the lower edge of a shell or casing 8 conforming to the configuration of the base except at its rear end it is provided with an inset portion forming an exterior recess 9 and conforming to the configuration of and fitting tightly within the rear portion 7 of the marginal groove 6. The shell 8 which forms a hollow casing and provides a water chamber or reservoir is constructed of aluminum and preferably consists of a casting. The casing 8 tapers upwardly and its lower edges are calked in the marginal groove by an expansible packing 10 to form a water and steam tight joint. The packing 10 which is round in cross section is compressed in the marginal groove 6 by the fastening means hereinafter described for securing the casing and the base together. A graphite coated asbestos packing has proven highly satisfactory. The aluminum permits rapid radiation of heat and assists in the control of the temperature of the water within the reservoir without affecting or interfering with the functioning of the base in retaining heat and in enabling the heating means to maintain the lower pressing face of the base at the desired temperature. The expansible packing compensates for the unequal expansion and contraction of the cast iron base and the aluminum casing and prevents any leakage at the joint between the base and the casing due to such unequal expansion and contraction.

The lower section 3 of the base is provided at opposite sides with curved grooves 11 arranged in substantial parallelism with the side edges of the section 3 which is also provided with a recess 12. The recess 12 extends over the major portion of the area of the lower section and receives an electric heating device 13 which may be of any desired construction. The recess 12 is tapered and conforms generally to the configuration of the base. The groove 11 and the recess 12 of the lower section of the base are covered by the upper section 2 which is provided in its lower face with a recess 14 similar to the recess 12 of the lower section 3 and forming with the same a chamber to receive a heat repellent and reflecting element 15 arranged above and conforming to the configuration of the electric heating device for reflecting the heat of said electric heating device downwardly so as to partially insulate the upper portion of the iron from the intense heat of the heating element and thereby utilize an increased or maximum amount of heat of the heating element for heating the effective portion of the pressing iron, namely the lower section of the base thereof. The heat repellent and reflecting element may consist of a polished or unpolished plate of metal or it may consist of heat insulating material. Within the recess 14 in the lower face of the upper section of the base is arranged a plurality of layers of heat insulating material preferably asbestos but any other suitable heat insulating material may of course be provided.

By partially insulating the upper portion of the iron by means of the insulating material and the heat repellent element a current of less power may be employed for operating the iron and there will also be a corresponding decrease in the consumption of the electric current. The upper and lower sections of the base are secured together by screws 16 piercing the upper section and engaging threaded sockets 17 of bosses 18 of the lower section 3. The upper section is also provided at the fastening devices with bosses 19, the bosses 19 and 18 being arranged at intervals and projecting into the recesses of the upper and lower sections. The recesses 12 and 14 of the lower and upper sections of the base are provided with rear extensions 20 and 21 to provide a space to receive the terminals 22 of the heating device. The terminals 22 of the heating device extend to points beneath the rear exterior recess 9 of the casing and are connected to insulated contacts 23 consisting of vertical pins passing through spaced openings in the rear portion of the upper section of the base and firmly clamped to the same by nuts 24. The upwardly projecting portions of the contact elements 23 are located in the exterior recess 9 of the casing and are adapted to be inserted in an ordinary plug of an electric cord for connecting the iron to a source of current supply. The recess 9 of the casing is closed at the rear by a plate 25 suitably secured to the casing at the opposite walls of the rear recess 9 to form a socket for the plug of the electric cord. The socket formed by the recess 9 and the plate 25 is of a size to receive the plug of the electric cord and the walls of the recess and the plate assist in supporting the plug and holding the same against lateral movement and thereby increase the life of the electric cord. The plate 25 may conveniently consist of a name plate and bear suitable data such as a trademark, the number or numbers of patents, the name of the manufacturer and the like.

The casing forms an interior reservoir or water chamber 26 and the upper section 2 of the base 1 constitutes the bottom wall of the reservoir and forms with the casing a hollow body and is provided at spaced points with front and rear bosses 27 having threaded sockets 28 for the reception of vertical screws 29 which pierce the top of the casing and also terminal portions 30 of handle supports 31. The handle supports consist of metal straps and are suitably secured to a connecting handle 31' constructed of wood or other suitable material and located above and extending longitudinally of the casing in the usual manner. The screws 29 which are preferably provided at their upper ends with polygonal heads 38 are adapted to be tightened by a wrench or other tool for compressing the packing in the marginal groove 6 of the base sufficiently to form a water and steam tight joint and to prevent any leakage due to unequal expansion and contraction of the aluminum casing and the cast iron base.

The lower section 3 of the base is provided in the grooves 11 with front and rear ports 32 and 33 consisting of perforations extending from the bottom wall of the grooves 11 and from the bottom of a recess 34 through the lower section to the pressing or working face of the same. The recess 34 connects the front ends of the curved grooves and provides a space for the discharge of steam from a steam pipe 35 extending from the steam dome 36 and forming a conduit for the passage of steam from the steam dome to the grooves 11 and the ports 32 and 33. The front ports 32 which are of greater diameter than the rear ports 33 discharge wet steam in the normal operation of the iron while the same is in use and they consist of substantially cylindrical upper portions and lower downwardly flared portions 37 which permit ready escape of steam and a uniform spreading or distribution of the same in the fabric to dampen effectively and uniformly the fabric and at the same time prevent the steam from backing up in the perforations and condensing into water and wetting the fabric. The steam conduit is of sufficient diameter to permit the discharge or escape of steam without pressure when the iron is in use. The ports 32 are close together from the intermediate portion of the iron to the front end to permit an even or uniform distribution of the steam to the fabric being ironed so that all of the fabric will be properly dampened without missing any portion operated on so that there will be no dry spots in the dampened area.

In practice the wet steam will be discharged through the front perforations during the operation of ironing. The small rear perforations which may or may not have their lower portions flared are provided to permit the passage of a sufficient amount of wet steam to prevent the iron from burning a fabric should the iron be left unattended and resting upon a fabric. By this construction there is no liability of the electric steaming iron burning the fabric so long as there is any water in the iron and it has been found in practice that the electric steaming iron may be left upon a fabric for at least two minutes without scorching the fabric. When the iron is lifted from a garment or other fabric the steam will discharge through the ports and the discharge of steam from the ports of the base will enable the iron to be placed on various kinds of materials such as wool, silk, linen and the like without requiring a heat adjusting device and without liability of burning the material.

The steam dome 36 which may be substantially cylindrical may be sectional or formed of a single piece with the aluminum casing. It is, however, preferably made separate from the casing 8 as clearly illustrated in Fig. 1 of the drawings and has a mechanical pressure fit in a lower section or tubular portion 36ª whereby it is adapted to operate as a safety valve and be lifted by and release any excessive pressure above the normal running pressure of the iron, thereby entirely eliminating any danger of a steam explosion or cracking of the aluminum casing should the steam outlet become plugged and prevent the escape of steam. It is provided with a dome shaped top and the steam pipe 35 which is approximately L-shaped extends downwardly from the steam dome through a steam chamber 39 to the lower portion of the reservoir 26 and then longitudinally of the iron to the front portion thereof. It is connected by a suitable coupling 40 with a substantially L-shaped pipe section 41 which is threaded into an opening 42 in the front portion of the upper section 2 of the base for conducting the steam to the recess 34 which facilitates a uniform distribution of the wet steam to the curved grooves 11 and the ports 32 and 33.

The steam pipe may be connected with the opening 42 in the upper section of the base in any other suitable manner and the recess 34 may be of any desired area and of a size to form practically a continuous groove for the passage of the wet steam to the ports 32 and 33.

The steam chamber 39 is formed at the rear portion of the casing by an inclined partition 43 extending upwardly and forwardly from the lower portion of the rear wall of the casing to the top wall thereof at a point intermediate of the ends of the casing as clearly illustrated in Fig. 1 of the drawings. The lower rear end of the partition is provided with a recess 44 to fit the inset portion of the rear wall of the casing and the marginal edges of the inclined partition form a water-tight connection between the partition and the casing. The partition may be secured within the casing in any suitable manner and the casing is provided at the upper front transverse edge of the partition with a series of lugs 45 which form abutments for the upper end of the partition so that the partition may be forced into tight engagement with the interior of the casing without liability of slipping when relatively high pressure is applied to the partition for forcing it into proper position within the casing.

The top portion 46 of the partition is arranged at a slight angle to the body portion of the partition and also at a slight angle to the top of the casing and is provided with perforations 47 for the passage of steam from the reservoir into the steam dome. The perforations 47 are preferably arranged in groups and any desired number of such perforations may of course be employed. The steam outlet ports or perforations leading from the reservoir to the steam chamber 39 are located adjacent the top of the casing in order to arrange them in position remote from the water within the reservoir and in order to prevent splashing of water through the perforations or openings 47 by the movement of the pressing iron during the use of the same an upper combined baffle and splash plate 48 is arranged within the casing at the upper portion thereof. The upper baffle and splash plate 48 which extends entirely across the casing has curved side edges 49 which fit and conform to the configuration of the side walls of the casing and which are preferably pressed into tight engagement with the same but any other suitable means may be employed for securing the plate 48 within the casing. The plate 48 which is provided with an opening 50 for the passage of the rear screw 29 extends upwardly from the rear portion of the casing to a point adjacent the top of the casing and in advance of the front upper end of the partition so that it forms an effective anti-splash means for preventing water from splashing upwardly through the openings 47.

In order to control the temperature of the water within the reservoir and reduce the boil or active ebullition of the same such as foaming and bubbling when the water within the reservoir is heated a lower inclined baffle plate 51 is provided. The lower baffle plate 51 which is of greater length than the upper baffle plate extends from the lower rear portion of the casing to the upper front portion of the same and it forms a plurality of passages for the circulation of water from one end of the casing to the other whereby when heat is applied to the water the water will be set in motion by such circulation around the lower baffle plate and air pockets in steam bubbles will be broken up and expansion of the water under the influence of heat reduced and the temperature of the water controlled so that the water will not be permitted to boil or foam up and bubble through the steam outlet openings 47 and pass into the steam chamber 39. The lower baffle plate which has its upper and lower ends spaced from the front and rear end walls of the casing thereby provides communicating passages for the circulation of the water and permits the water to pass around the ends of the lower baffle plate and circulate freely within the reservoir from one end of the iron to the other. The plate 51 is provided with curved edges 52 to fit the inner surfaces of the side walls of the casing and it is preferably pressed into tight frictional engagement with the side walls of the casing for holding it in position but any other suitable fastening means may be provided for this purpose. The lower baffle plate is provided with openings 53 for the passage of the screws 29 and it has a central recess 54 at its lower rear end to permit it to straddle the steam pipe and extend in rear of the same at opposite sides thereof.

The casing is provided at its intermediate portion with a filling orifice 55 preferably surrounded by an upwardly extending annular flange or boss 56 which is exteriorly screw threaded for the reception of a removable closure cap 57 but the filling orifice may be provided with a closure of any other desired form.

When the water is heated within the water reservoir 26 the heat will cause a circulation of the water around the lower baffle which by such circulation and also by the breaking up of air pockets in the bubbles controls the boiling of the water so that the water will not boil up through the steam outlets 47. The upper baffle or splash plate 48 will prevent water from splashing through the openings 47 when the iron is in use and the backward and forward movement of the iron will not prevent the continuous circulation of the water around the lower baffle plate.

The water is boiled below the baffle plate 51 and this plate being at a slant within the casing forces the bubbles to carry or move upwardly along the inclined lower face of the baffle plate 51 toward the front of the iron. Above the baffle plate 51 water does not boil. The boiling occurring at the front of the iron boils over the top of the baffle plate and into the cooler non-boiling water and is thereby cooled to a temperature below the boiling point.

At the rear end of the baffle plate 51 there is a slight clearance between the baffle plate 51 and the casing 8 which allows the water to run back down under the baffle plate 51 causing constant circulation of the water around said baffle plate 51. The duty of the baffle plate 48 is to check the overflowing boil at the forward part of the baffle plate 51 and permit the correct amount of steam to pass on to the partition 43 allowing only the proper amount of steam to pass through the holes 47 to the steam pipe thereby preventing more steam passing to the steam pipe than the latter can carry to the distributing means at the base of the iron. The partition 43 also operates to prevent a splash from occurring when the iron is in motion. With this arrangement of the baffle 48 and the partition 43 the amount of steam on the water placed in the iron can be limited.

The baffle plate 48 is initially flat as illustrated in Fig. 10 of the drawings but when pressed into the position shown in the drawings is curved transversely as illustrated in Fig. 2 of the drawings and presents a lower concave face and an upper convex face. The central portion 48ª of the rear edge of the baffle plate 48 abuts against the partition 43 and the downwardly curved side portions 48ᵇ of the rear edge of the baffle plate 48 are spaced from the partition forming clearance at opposite sides of the central abutting portion of the rear edge of the baffle plate 48. This construction, the abutting of the central portion of the rear edge of the baffle plate 48 against the partition 43 enables the baffle plate 48 to take care of any forcible boil which might come up through the clearance between the rear end of the baffle plate 51 and the casing 8 by holding such boil down between it and the baffle plate 51 and deflecting the air bubbles to a deviated course. This prevents the boil occurring at said clearance between the rear end of the baffle plate 51 and the casing 8 from going directly upward into the holes 47 of the partition 43. If the upward course of the bubbles were not changed by interposing the baffle plate 48 between the baffle plate 51 and the partition 43 the bubbles would continue upward to the partition 43 and travel along the same to the holes 47. The baffle plate 48 carries the boil along its lower face in a forward and upward direction until it is finally dissipated against the boil that is overflowing at the clearance between the front end of the baffle plate 51 and the casing 8. Also the rapid diffusion and radiation of the heat by the aluminum casing will assist in the control of the temperature and boiling of the water within the reservoir and as the major portion of the heat of the electric heating device is deflected and radiated downwardly by the heat repelling plate assisted by the layers of insulating material the radiation of heat from the reservoir by the aluminum casing will not interfere with the effective heating of the base of the iron by the heating device.

What is claimed is:

1. In a self-contained steam generating pressing iron having a pressing face, in combination, a water reservoir having a top, bottom, and ends, a steam dome communicating with the upper part of the reservoir, a steam pipe leading from the steam dome to the pressing face of said iron, and an inclined baffle located in the reservoir and extending longitudinally of the iron and the major part of the length of the reservoir and terminating short of the ends of the reservoir and spaced from the bottom of the reservoir and arranged at an inclination to form inclined longitudinal passages communicating with each other at the ends of the reservoir for causing a continuous circulation of the entire body of water within the reservoir from one end of the iron to the other when the water is heated, the water in one passage moving in one direction longitudinally of the iron and the water in the other passage simultaneously moving in the opposite direction longitudinally of the iron and said baffle plate being located in the path of and adapted to break up air pockets in bubbles to prevent expansion of the water and reduce active ebullition of the same, whereby boiling of the water is reduced to prevent the water from boiling and flowing into the steam dome.

2. In a self-contained steam generating pressing iron having a pressing face, in combination, a water reservoir having a top, bottom, and ends, means for conducting steam from the upper part of the reservoir to the pressing face of the iron, and an inclined baffle located in the reservoir and extending longitudinally of the iron the major part of the length of the reservoir and terminating short of the ends of the reservoir and spaced from the bottom of the same and arranged at an inclination to form inclined longitudinal passages communicating with each other at the ends of the reservoir for causing a continuous circulation of the entire body of water within the reservoir from one end of the iron to the other end thereof when the water is heated, the water in one passage moving in one direction longitudinally of the iron and the water in the other passage simultaneously moving in the opposite direction longitudinally of the iron and said baffle being located in the path of and adapted to break up air pockets in bubbles to prevent expansion of the water and reduce active ebullition of the same whereby boiling of water within the reservoir is reduced to prevent the water from boiling into the means for conducting steam from the reservoir to the pressing surface of the iron.

3. In a self-contained steam generating pressing iron having a pressing face, in combination, a water reservoir having a top, bottom, and ends, means for conducting steam from the upper part of the water reservoir to the pressing face of the iron, and means located within the reservoir for forming separate upper and lower inclined longitudinal passages therein arranged to produce a continuous circulation of the entire body of water within the reservoir from one end of the iron to the other when the water is heated, the water in the upper passage moving longitudinally of the iron in one direction and the water in the lower passage simultaneously moving in the opposite direction longitudinally of the iron and said means being arranged in the path of bubbles for breaking up air pockets therein to prevent expansion of the water, the circulation of the water and the preventing of expansion of the same operating to reduce the boiling of the water and also preventing the water from foaming into the means for conducting steam to the pressing face of the iron.

4. In a self-contained steam generating pressing iron having a pressing face, in combination, a water reservoir having a top, bottom and ends, a steam dome located above the water reservoir and communicating therewith, a steam conduit leading from the steam dome to the pressing face of said iron, a splash plate disposed longitudinally of the reservoir below the steam dome and above the normal level of the water within the reservoir to prevent water splashing upward towards the steam dome when the iron is in use, and an inclined baffle located below and in approximately parallelism with the splash plate and substantially extending longitudinally of the iron substantially the length of the reservoir and terminating short of the ends thereof and forming separate longitudinal passages for causing a circulation of water within the reservoir, the water in one of the passages moving longitudinally of the iron in one direction and the water in the other passage simultaneously moving in the opposite direction to reduce the boiling of the water.

5. In a self-contained steam generating pressing iron having a pressing face, in combination, a water reservoir having a top, bottom and ends in which steam is generated, means for conducting the steam from the upper part of the reservoir to the pressing face of the iron, a lower inclined baffle plate arranged within the reservoir and extending longitudinally thereof the major part of the length of the reservoir and terminating short of the ends of the reservoir to form upper and lower passages communicating with each other at each end for the circulation of water within the reservoir, the water within one of the passages moving in one direction longitudinally of the iron and the water in the other passage simultaneously moving in the opposite direction longitudinally of the iron to reduce ebullition, and an upper splash plate located above the normal level of the water within the reservoir and arranged to prevent water from being splashed into the steam conducting means by the movement of the iron when the same is in use.

6. In a self-contained steam generating pressing iron, in combination, a water reservoir, having a top, bottom, and ends, a steam dome located above and communicating with the water reservoir, means for conducting steam from the steam dome to the pressing face of said iron, a lower inclined baffle plate arranged within the reservoir and extending longitudinally of the reservoir and terminating short of the ends thereof forming longitudinal passages communicating with each other at each end of the reservoir for the circulation of water, an upper inclined splash plate located above the normal level of the water within the reservoir and spaced from the lower baffle plate and arranged to prevent water from splashing upward from the reservoir into the steam dome when the iron is in use, and a partition extending across the bottom of the steam dome and having a steam passage located between the splash plate and the top of the reservoir for permitting the passage of steam from the reservoir to the steam dome.

7. In a steaming and pressing iron adapted to apply steam to the article being pressed, a hollow body having a top, bottom, and ends and provided with a lower pressing face, a partition within the hollow body extending entirely across the body from the top thereof to one end of the same and dividing the same into a water reservoir and a separate steam chamber and having steam passages at the upper portion of the steam chamber to permit passage of steam from the water reservoir to the steam chamber, means for heating water in the reservoir for the purpose of generating steam and also for heating the pressing face, a steam conduit from the steam chamber to said face, and means located within the water reservoir and spaced from the said steam passages for preventing the passage of water from the reservoir through the steam passages into the steam chamber.

8. In a steaming and pressing iron adapted to apply steam to the article being pressed, a hollow body having a top, bottom, and ends and provided with a lower pressing face and provided at the top at one end with a steam dome, a transverse partition within the hollow body extending entirely across the body from the top thereof to one end of the same and dividing the same into a water reservoir and a separate steam chamber, said partition having steam passages at its upper portion, said steam chamber being located beneath and communicating with the steam dome, means for heating water in the reservoir for the purpose of generating steam and also for heating the pressing face, a steam conduit from the steam dome to said pressing face, and means located within the reservoir and spaced from the said steam passages for preventing water from splashing through the steam passages into the steam chamber.

9. In a steaming and pressing iron adapted to apply steam to the article being pressed, a hollow body having a top, bottom, and ends and provided with a lower pressing face and provided at the top at one end with a steam dome, an inclined partition located beneath the steam dome and extending from the top of the body to the adjacent end of the same and dividing the hollow body into a water reservoir and a separate steam chamber, said partition having steam passages at its upper portion, means for heating water within the reservoir and also for heating the pressing face, and a splash plate spaced from the partition and located beneath the steam passages and arranged to prevent water from splashing through the steam passages into the steam chamber when the iron is in use.

10. In a steaming and pressing iron adapted to apply steam to the article being pressed, a hollow body provided with a top, bottom and ends having a lower pressing face and provided at the top of one end with a steam dome, an inclined partition arranged within the hollow body and dividing the same into a water reservoir and a separate steam dome, said partition having steam passages at its upper portion to permit steam to pass from the water reservoir into the steam chamber, means for heating water in the reservoir for the purpose of generating steam and also for heating the pressing face, a steam pipe extending downwardly from the steam dome and through the inclined partition at one end of the hollow body and along the reservoir to the other end of the hollow body and communicating with said pressing face for conducting steam to the same, and an inclined baffle plate located within the reservoir in spaced relation to the bottom thereof and extending the major part of the length of the reservoir and forming upper and lower longitudinal passages arranged to cause circulation of all of the water within the reservoir from one end of the iron to the other, the water in the upper passage moving in one direction longitudinally of the iron and the water in the lower passage simultaneously moving in the opposite direction longitudinally of the iron, said lower baffle being located in the path of bubbles for breaking up air pockets therein to reduce boiling of the water and prevent the water from boiling upward sufficiently to flow into the steam dome.

11. A steaming and pressing iron including a base of heat retaining metal, a shell arranged upon the base and forming with the same a water reservoir and constructed of a metal adapted to permit rapid radiation of heat and having a different coefficient of expansion from that of the base, a packing interposed between the lower edge of the shell and the base and seated within the latter and forming a watertight joint and expansible to permit unequal expansion and contraction of the shell and the base without affecting the water-tight joint or connection between the shell and the base.

12. A steaming and pressing iron including a cast iron base having a pressing face, and an aluminum shell mounted on the base and forming with the base a reservoir, said shell having a different coefficient of expansion from that of the base, heating means for heating water within the reservoir for the purpose of generating steam and also for heating said pressing face, said aluminum shell permitting rapid radiation of heat for assisting in controlling the temperature of the water within the reservoir without interfering with the efficiency of the heat holding characteristics of the base for maintaining the pressing face at the desired temperature, and means for forming a leakproof expansible joint between the aluminum shell and the cast iron base, whereby unequal expansion and contraction of the base and the shell are permitted and leakage of water from the reservoir prevented.

13. A steaming and pressing iron including a base having a pressing face, a shell mounted upon the base and provided with a steam dome, an inclined partition located beneath the steam dome and dividing the interior of the shell into a reservoir and a separate steam chamber and having steam inlet openings at its upper portion to permit steam to pass from the reservoir into the steam chamber and the steam dome, a steam pipe extending downwardly from the steam dome and passing through the inclined partition and extending along the lower portion of the reservoir and communicating with the pressing face for conducting steam to the same, a lower inclined baffle plate extending longitudinally of the water reservoir and having its lower end straddling the upright portion of the steam pipe, said lower baffle plate forming passages for causing the circulation of water within the reservoir when the same is heated, and an upper splash plate spaced from the lower baffle plate and from the partition and located below the steam inlet openings thereof for preventing water from being splashed through the said openings by the movement of the iron when the same is in use.

14. An electric steaming iron including a base, a shell mounted upon the base and having a horizontal cross section conforming in shape to substantially the configuration of the base and provided at the rear end with an inset portion forming a recess, an electric heater, electric contact elements electrically connected with said heater and located within said recess and adapted to be inserted in the plug of an electric cord, and a plate mounted on the shell and extending across the recess thereof and forming a rear wall for the same to provide a socket for the reception of the plug of the electric cord.

15. In a steaming and pressing iron, in combination, a shell provided at the top at its inner surface with a transverse series of lugs, and an inclined partition arranged within the shell and dividing the space within the same into a reservoir and a steam chamber, said partition having its upper end abutting the said lugs and its side edges frictionally engaging the interior of the shell and provided with means for permitting steam to pass from the reservoir into the steam chamber.

16. A steaming and pressing iron of sad-iron shape comprising a hollow elongated reservoir for containing water, and a pressing face, means for heating the iron for heating the pressing face thereof and for generating steam within the reservoir, steam conducting means whereby generated steam in the iron is supplied exteriorly to the pressing face from the upper part of the reservoir, and baffle means in the reservoir arranged for causing constant circulation of all of the heated water within the reservoir lengthwise thereof in separate longitudinal passages, the water in one passage moving in one direction longitudinally of the iron and the water in the other passage simultaneously moving in the opposite direction longitudinally of the iron, said baffle means being also arranged in the path of ascending bubbles for breaking up air pockets in bubbles to prevent increase in volume of the heated water due to entrained bubbles and the flowing of the same into the steam conducting means.

17. In a self-contained steam generating iron, in combination, a water reservoir having a top, bottom, and ends, a steam dome connected with the water reservoir at the upper part thereof and composed of upper and lower tubular sections, the upper tubular section having a mechanical pressure fit securing it to the lower section whereby the upper section is adapted to operate as a safety valve and be lifted by and release any excessive steam pressure above the normal running pressure of the iron, and means for conducting steam from the steam dome to the pressing face of the iron.

18. An electric steaming iron including a base, a shell having a horizontal cross section conforming in shape to substantially the configuration of the base and provided at the rear end with an inset portion forming over said base a recess having a bottom wall provided with spaced openings, an electric heater in said base for heating water within the shell, electric contact elements located in said recess and mounted in said spaced openings of said bottom wall and electrically connected with the heater and adapted to be inserted in the plug of an electric cord, and a wall member mounted on the shell and extending across the recess thereof and forming a rear wall for the same to provide a socket for the reception of the plug of the electric cord.

DONALD A. DEEMS.